Aug. 11, 1936.  F. A. RANDALL ET AL  2,050,585
AUTOMATIC FRUIT PRESSING DEVICE
Filed Oct. 10, 1933    6 Sheets-Sheet 1

INVENTORS
FRANK A. RANDALL
JOHN D. CANTONI.
BY Jas. M. Naylor
ATTORNEY

Aug. 11, 1936.  F. A. RANDALL ET AL  2,050,585
AUTOMATIC FRUIT PRESSING DEVICE
Filed Oct. 10, 1933   6 Sheets-Sheet 3

INVENTORS
FRANK A. RANDALL
JOHN D. CANTONI
BY
Jas. M. Naylor
ATTORNEY

INVENTORS.
FRANK A. RANDALL
JOHN D. CANTONI
BY Jas. M. Naylor
ATTORNEY

Patented Aug. 11, 1936

2,050,585

UNITED STATES PATENT OFFICE 2,050,585

AUTOMATIC FRUIT-PRESSING DEVICE

Frank A. Randall and John D. Cantoni, Napa, Calif., assignors to California Prune & Apricot Growers Association, San Jose, Calif., a corporation of California Application October 10, 1933, Serial No. 692,920

19 Claims. (Cl. 100—56)

This invention relates to automatic fruit presses, and particularly to those which are adapted to press the processed fruit into boxes in preparation for lidding the boxes for shipment.

In general practice, the dried fruits, such as prunes and the like, before shipment are subjected to a cooking or sterilizing process, after which they are guided to the scales. There they are placed loosely into boxes to overflow the latter. In order to prevent the fruit from falling from the boxes, a detachable collar is placed over each box. Then the fruit is pressed to slightly below the top edge of the box, so that the latter will be uniformly filled with the fruit. The pressing process is of great importance, as it prevents the bulk of the fruit from drying out and becoming contaminated, which would be the case were the boxes loosely filled and then lidded.

The object of this invention is to provide a fruit press which is fully automatic and which applies an equal and uniform pressure to every individual box, thus insuring the uniformity of the resulting package.

Another object of this invention is to provide a fruit press which carries means therewith for automatic removal of the collars from the boxes and the return of the former to the point of application to the latter.

As there are two sizes of boxes in general use in the packing of dried fruit, it is an object of this invention to provide a fruit press having means for quick and ready adjustment to accommodate either size.

Other objects and advantages of this invention will become apparent as the specification proceeds and the novelty of the invention will be particularly pointed out in the appended claims.

In general terms, the device consists of a conveyor which carries filled boxes with detachable collars thereon, and an endless belt above said conveyor, carrying pressing members attached thereto, said belt being inclined with respect to the conveyor so that the distance therebetween diminishes in the direction of the movement of said belt. Means are provided for timing the movements of the boxes and said pressing members, so that the latter enter the former at one end of the device and both move simultaneously to the other end. As the distance between the conveyor and the belt diminishes, the pressing member is forced into the box and thereby presses the fruit. Means are provided for removal of the collars from the boxes when the pressing operation is completed and placing them on a separate conveyor, which returns them to the point of application to the boxes. A simple mechanism is also provided for quick adjustment of the press to accommodate boxes of different sizes.

A detailed description of the invention follows:

The delivery mechanism is supported by an outer frame 1 mounted on the legs 2 and an inner frame 3, which supports an endless belt 4, running around a pulley 5, which turns on a shaft 6. Boxes 7 having collars 8 in place and filled loosely with fruit are weighed and placed on the belt 4 upon which they travel between the guides 9 which are supported by the posts 10 and the brackets 11 on the frame posts 12 of the pressing machine proper. Each box travels forwardly until its movement is checked by the stops 13, the purpose of which is to prevent crowding of boxes awaiting the proper time to enter the pressing mechanism. The stops 13 are pivotally connected to the bars 14 as at 18 disposed on either side of the belt 4. The bars 14 are mounted on four links 16, which normally allow the former to rest on the inner frame 3, so that the top thereof is below the level of the belt 4. The rods 15 pivotally connect the links 16 to the frame 3.

Figure 1:
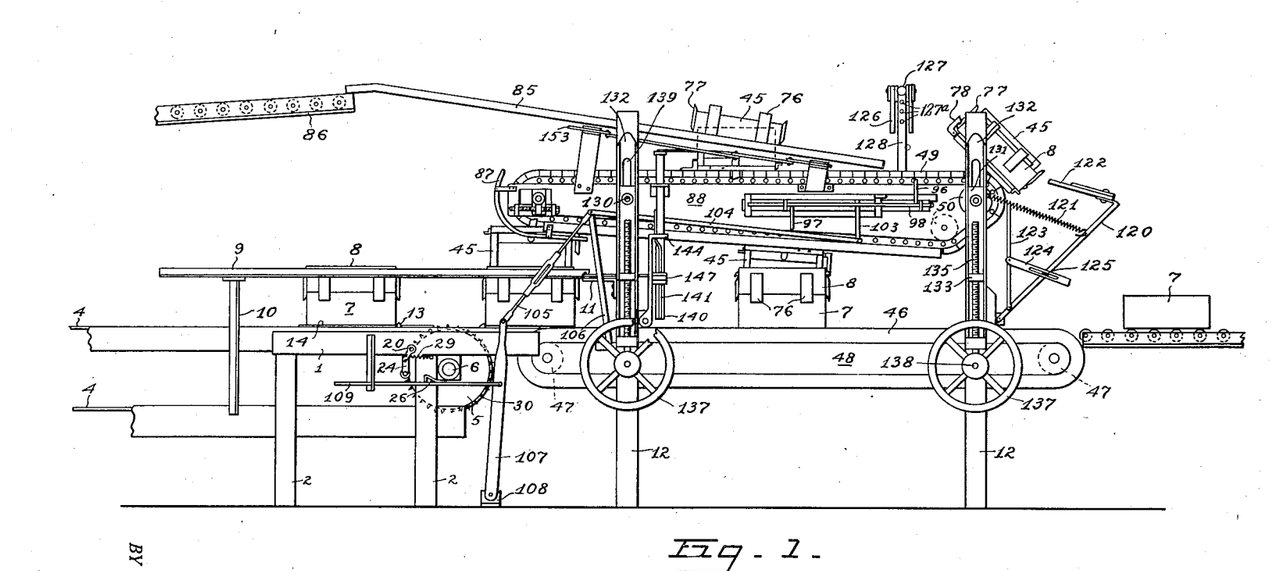
Figure 1 is an assembly view of our invention.
Figure 2:
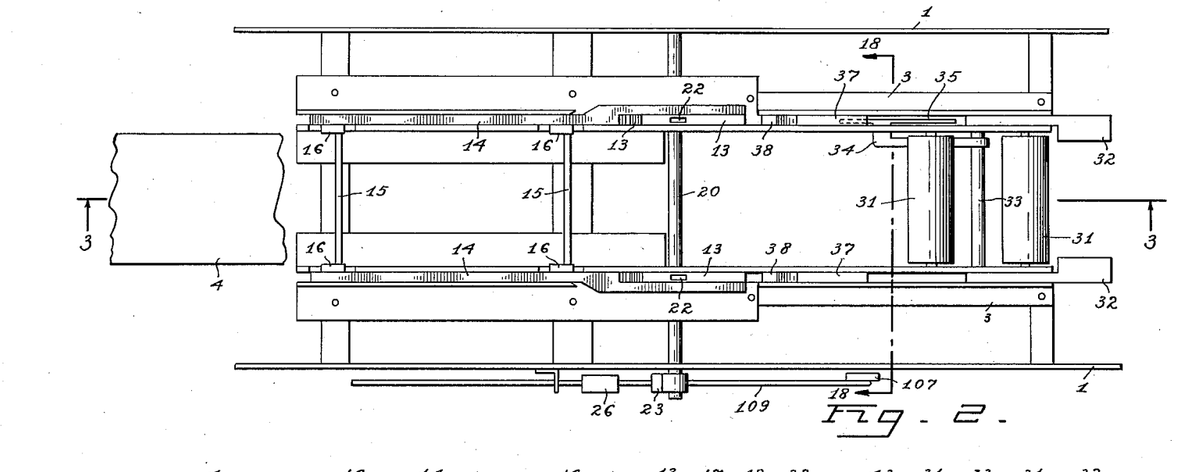
Figure 2 is a top plan view of the delivery mechanism, the belt being broken away to show details.
Figure 3:
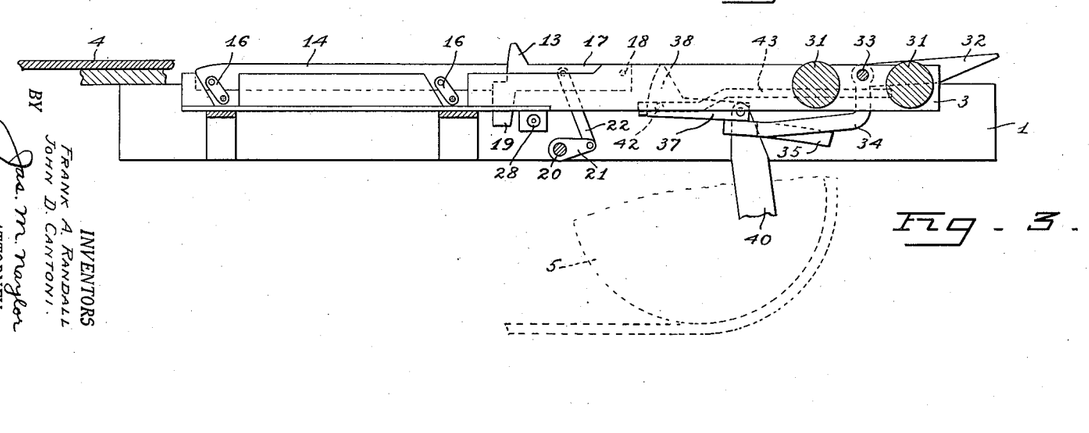
Figure 3 is a sectional view taken along the line 3—3 of Figure 2.

Each of the stops 13 has a body portion 17 and the dependent portion 19, and is operatively connected to a shaft 20 by means of link 22 and arm 21. To one end of the shaft 20 is affixed an arm 23 to which a lever 24 is swingably attached. The lever 24 carries a roller 25 adapted to be engaged by a lug 26 of the timing mechanism. The lever 24 has the upstanding piece 27 which engages the arm 23 and prevents rotation of the lever in clockwise direction. A spring 29 returns the arm 23 to its normal position as shown in Figure 1.

The function of the mechanism just described is as follows:

When the box 7 strikes the stops 13 its momentum carries the latter and the bars 14 associated therewith forwardly and upwardly so that the bars rise on the links 16 and thus lift the box clear of the belt 4, checking its forward movement. It is held in that position until the path ahead is clear. Then the movement of the lug 26 to the left (looking at Figure 4), by means of the roller 25, lever 24 and arm 23, rotates the shaft 20 in clockwise direction and by means of the arms 21 and links 22 forces the stops 13 down. As they come down, the portions 19 thereof, acting on the rollers 28 mounted on the frame 3, force the bars 14 to swing on their pivotal points and drop on the frame 3 below the belt level. The box again rests on the moving belt and is thereby moved forwardly. As soon as the box is released by the stops and passes over them, the stops 13 are free to rise and are forced to do so by means of the spring 29 as soon as the back end of the box has passed over it. The hooks on the collars, to be described in detail later, separate the boxes enough to allow the stops 13 to come up between them and stop the following box. The box then moves on toward the second stop. It passes off the belt onto the idler rollers 31 and onto the shoes 32, which, being inclined upwardly, tend to act as a brake. Shoes 32 and a lever 34 are irrevolubly mounted on a shaft 33. A cam 35 is secured to the outer angled end of lever 34. (See Fig. 4.)

Figure 4:
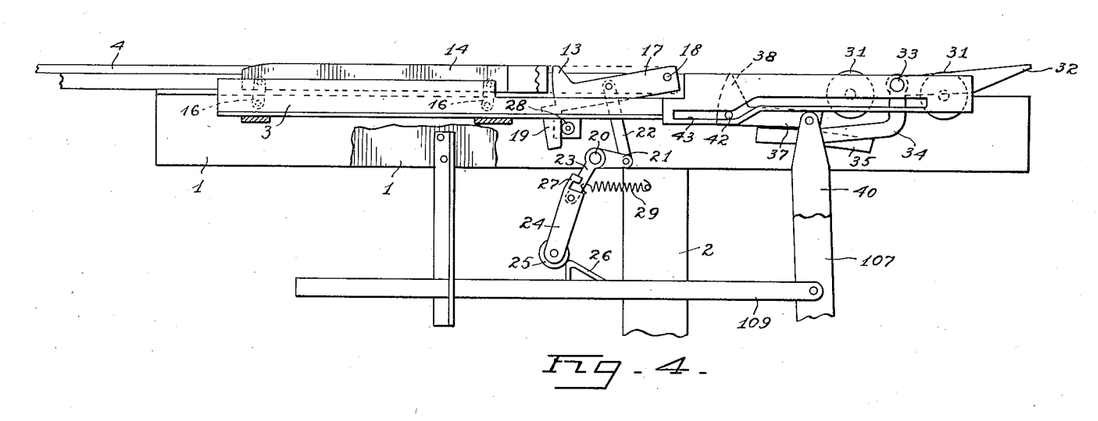
Figure 4 is a side elevation of the delivery mechanism.
Figure 5:
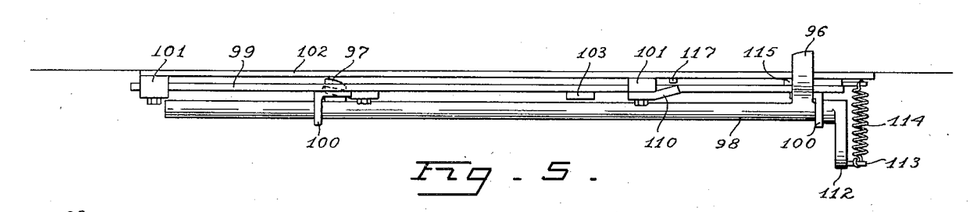
Figure 5 is a top plan view of a portion of the mechanism which operates the timing devices.
Figure 6:
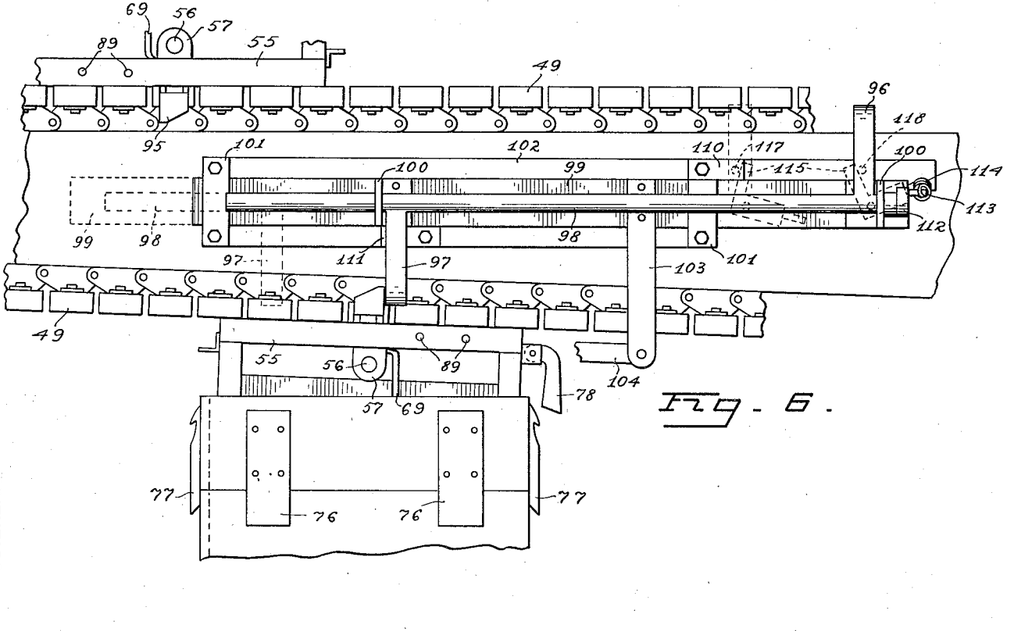
Figure 6 is a side elevation of a portion of the invention, with particular reference to the mechanism illustrated in Figure 5 in relation to other parts, and showing the details of the pressing block as it enters a box.
Figure 7:
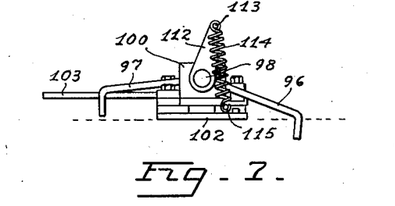
Figure 7 is a detailed end view of the mechanism illustrated in Figure 5, showing the arms in one position.
Figure 8:
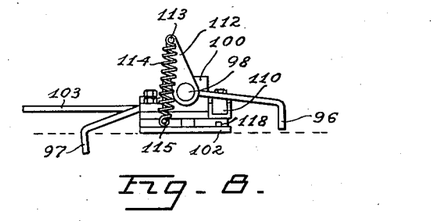
Figure 8 is another view of the mechanism shown in Figure 7, with the arms in the opposite position.

In line with the stops 13 and behind them are the thrust dogs 38 adapted to slide between the stationary members of the frame 3. The dogs 38 carry pins 42 on their outer sides which project into and ride in the slots 43 cut in the frame 3. The slots 43 are so designed that the dogs being pulled forwardly by means of the levers 40 pivotally connected to the ends 37 thereof, will move upwardly and push the box standing on the idler rollers 31 ahead. The end 37 of one of the dogs 38 normally rests on the cam 35 and, through the pivotal action about the axis of shaft 33, thereby keeps the shoes 32 inclined upwardly to arrest the forward movement of the box. The cam 35 is released, and shoes 32 drop out of the path of the oncoming box, when the end 37 of dog 38 moves off the high point of cam 35, thus permitting the thrust dogs 38 to engage the back of the box and move it onto conveyor belt 46.

While the box is standing in the position above described, a pressing member or block 45 enters it and the two start their journey through the pressing mechanism proper.

The mechanism through which the box is about to pass comprises, in general, the belt 46, turning on the pulleys 47, and over the support 48 borne by the posts 12. Above the belt 46 is the endless chain 49, inclined forwardly with respect to the belt 46, turning on the pulleys 50. Through the medium of suitable driving mechanism (not shown) identity of directional relation and speed between this chain 49 and belt 46 is maintained.

Figure 9:
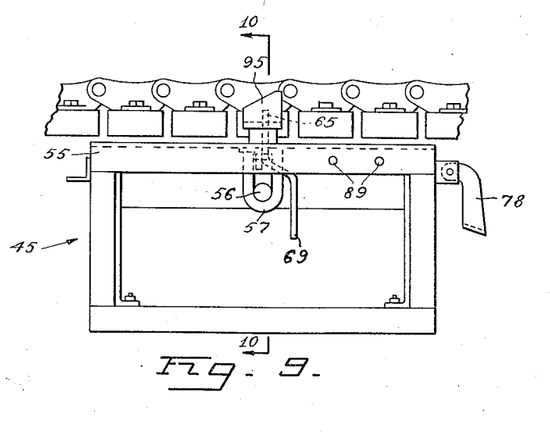
Figure 9 is a side elevation of the pressing block showing a portion of the chain to which same is connected.
Figure 10:
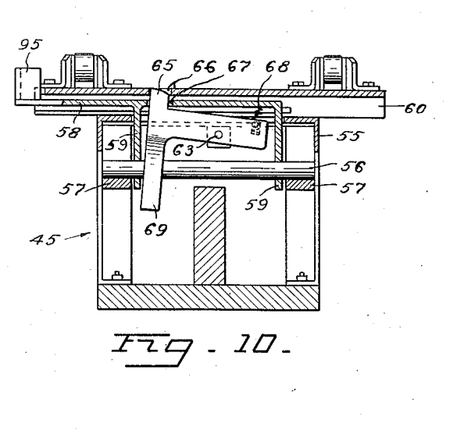
Figure 10 is a section taken along the line 10—10 of Figure 9.

The blocks 45, four of which are mounted in spaced relationship on the chain 49 when being used for small size boxes, are of hollow box-like construction, bound at their top edges by angle iron 55 as shown in Figures 9 and 10. A shaft 56 extends transversely of the box slightly below the top edge thereof, being loosely mounted in a pair of ears 57. A bracket 58 mounted transversely is rigidly connected to the shaft 56 by means of the lugs 59.

The bracket 58 facilitates connection of the blocks 45 to the chain 49. The regular wooden cleat covering the chain 49 is omitted in certain places and replaced by special sleeves 60, having upstanding walls 61 with flanges 62 fashioned thereon for retaining the bracket 58. The transverse movement of the block 45 in respect to the chain 49 is prevented by means of the latch 65 projecting through the slot 67 in the bracket 58 and the slot 66 in the sleeve 60. The latch is pivotally connected to the bracket 58 as at 63 and is yieldably held in latching position by means of the spring 68 releasable manually by means of the trigger 69.

Figure 16:
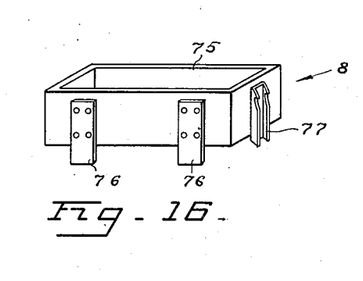
Figure 16 is a perspective of the box collar.

Each of the collars 8 comprises a frame 75 conforming to the external and internal dimensions of the box 7, and has four posts 76 fastened two on each side, as shown in Figure 16, which are adapted to fit snugly on the sides of the box during the pressing operation. The collars are normally fitted to the boxes just prior to the filling step. Elongated hooks 77 are rigidly secured to the ends of the collar, their lower ends engaging the box 7 to prevent longitudinal displacement.

Novel means have been provided for the removal of the collars 8 from the boxes 7 immediately after the pressing operation. When the blocks 45 have completely entered the boxes 7, the hook 77, rigidly secured to the forward end of the collar, engages the hook 78 mounted at the forward end of the block 45. The hooks are in engagement while the pressing operation is being completed and the block and collar pass upwardly with the chain 49 on the return trip. As soon as the block and collar turn upwardly in a horizontal plane, and are drawn into an inverted position, the hook 78, of its own weight, drops out of engagement with hook 77.

Figures 11, 12, 17, 18:
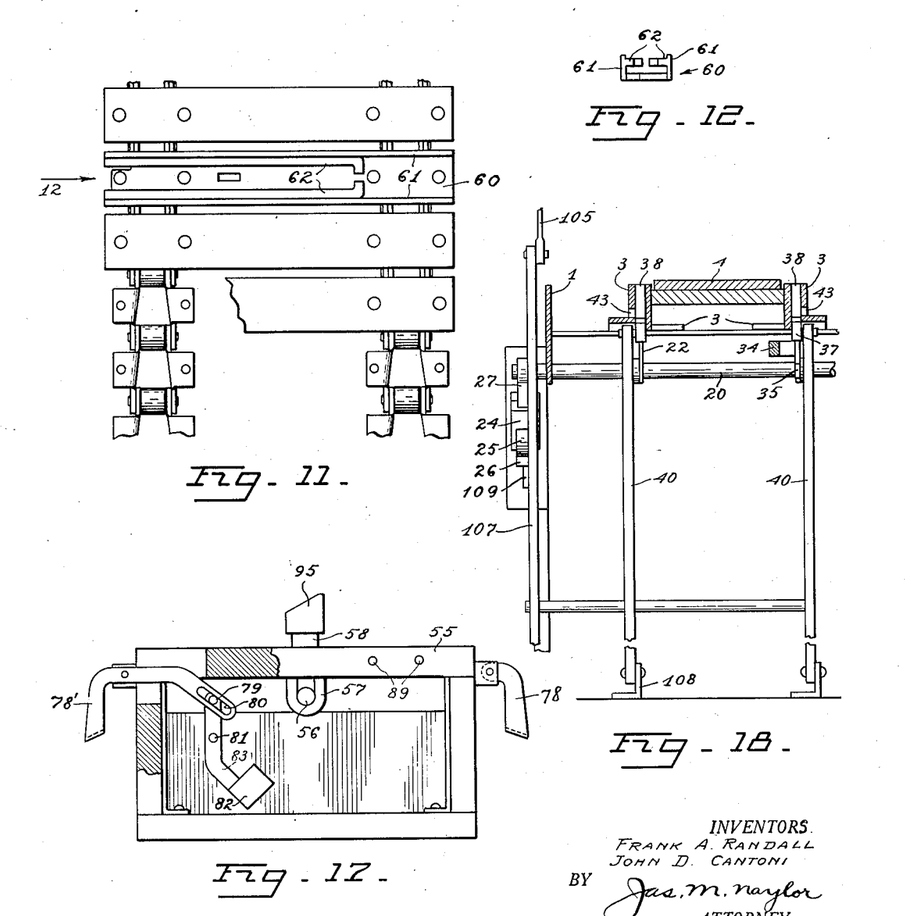
Figure 11 is a top plan view of a section of the chain showing the detail of same and the link to which the pressing block is attached.
Figure 12 is an end view of the particular link just mentioned, looking in the direction of the arrow 12 shown in Figure 11.
Figure 17 is another view of the pressing block, partly broken away to show the weighted hook.
Figure 18 is a section taken along the line 18—18 of Figure 2.
Figure 13:
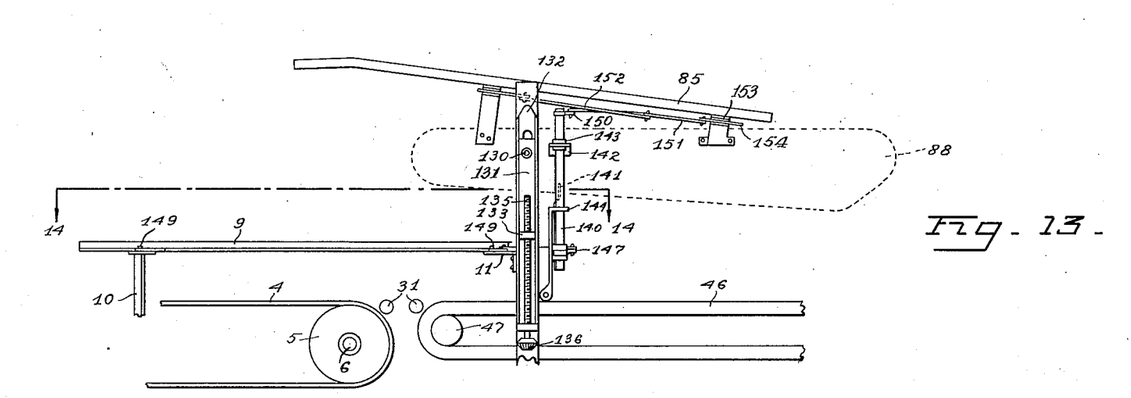
Figure 13 is a schematic view of the mechanism employed to adjust the machine to accommodate boxes of different sizes.
Figures 14, 15:
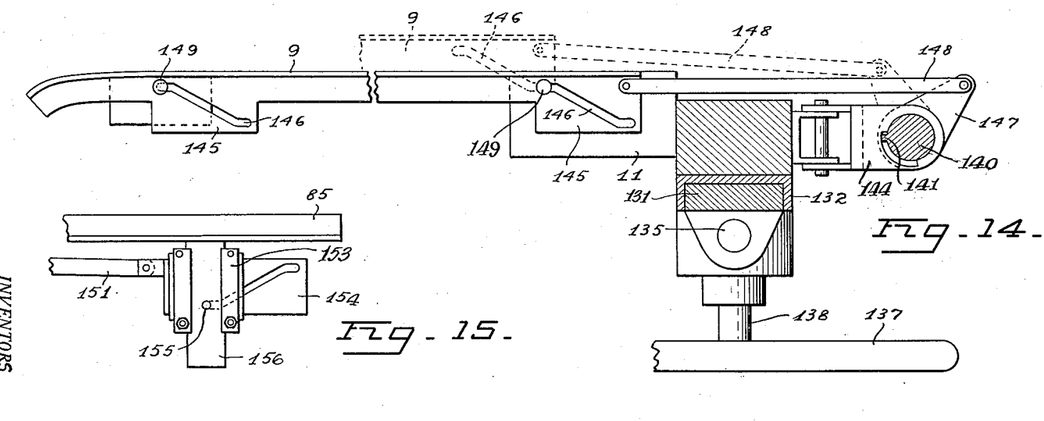
Figure 14 is a sectional view taken along the line 14—14 of Figure 13 and showing a portion of the mechanism shown in Figure 13, illustrating particularly the adjustment of the lower guide bar.
Figure 15 is a detailed top plan view of adjusting mechanism for the upper guide bar.

In Figure 17 we show an improvement over the pressing block illustrated in Figures 9 and 10, with particular reference to the hook 78. In the improved form the hook 78' has an extension projecting into the block. A weight 82 is mounted on the end of lever 83, which is pivotally mounted on pin 81 in the block. The extension of the hook is connected to the lever 83 by means of the pin 79 riding in the slot 80. When the block reaches the inverted position on the return trip, the weight 82 swings on its pivot and pulls the hook 78 out of engagement with the collar hook 77.

A pair of tracks 85, the detail of which will be hereinafter explained in connection with the adjustment mechanism associated therewith, mounted above the chain on an upward incline as shown in Figure 1, are sufficiently spaced apart to pass the block 45 therebetween but engage the upper edges of the posts 76 of the collar 8. An accumulation of collars on the tracks 85 drives the foremost one up the incline for deposit on the inclined collar chute 86, a portion of which is shown in Figure 1, over which they pass for repeated use.

Alignment of the boxes 7 and blocks 45, respectively, at the point of contact is attained by means of the guide bars 9 and 87, the latter being attached to the belt support 88. Pins 89 projecting from the sides of the block 45 ride over the bars 87, holding the same in position to drop directly into the box 7.

The timing device employed to insure delivery of a box 7 at the moment the block 45 is ready to fall comprises dogs 95 projecting outwardly from the brackets 58 on the blocks 45 which engage the arms 96 and 97 integral with the rod 98 while passing through the pressing operations and on the return therefrom, respectively.

The rod 98 is rotatably connected to a slide 99 by means of the apertured brackets 100 disposed on the outer sides of the arms 96 and 97. The slide 99 rides in the brackets 101 secured to a base plate 102 supported by the chain support 88.

The dog 95 on its return trip from the pressing operation engages the arm 96 and moves the rod 98 and the slide 99 rearwardly to actuate the delivery mechanism through the linkage comprising a member 103 dependent from the slide 99, a rod 104, a bar 105, the latter two members being connected to a pivotal post 106, and the lever 107, pivotally mounted on the block 108, and the rod 109 carrying the lug 26 hereinbefore described.

Having released one box from those awaiting pressing and actually delivered another for timed contact with the pressing block 45, the rod 98 and slide 99 are returned to their normal position by means of the engagement of one of the dogs 95 and the arm 97. To facilitate this action a pair of cams 110 and 111 are mounted on the base plate 102 between the arms 96 and 97 with their inclined surfaces oppositely disposed. As one of the dogs 95 engages the arm 96 and drives the rod 98 and the slide 99 rearwardly, the arm 96 strikes the incline of the cam 110 and is thrown out of engagement with the dog 95. To hold the arms 96 and 97 in this position while the rod 98 and the slide 99 are moving between the cams 110 and 111, one end of the rod 98 is angled as at 112 and provided with a pin 113 disposed parallel to the rod 98. Attached to the pin 113 is a spring 114 connected to the L-shaped member 115, pivotally mounted on the slide 99, as at 116, directly in line with the center of the rod 98. When the slide 99 and the members connected thereto are moved rearwardly, the free end of the L-shaped member 115 strikes a pin 117 projecting from the base plate 102 and is tripped backwardly, with respect to its own directional movement, pushing the opposite end downwardly. This causes the spring 114 to pull downwardly on the angled end 112 of the rod 98, maintaining the position of arms 96 and 97. When the dog 95 engages the arm 97 and drives the accompanying mechanism back toward its original position, the arm 97 rides on the cam 111 and the shaft 98 is rotated to throw arm 96 into position for engagement with the oncoming dog 95. The free end of L-shaped member 115 strikes a pin 118, identical with pin 117, and is tripped backwardly, drawing its opposite end upwardly. The spring 114 is again thrown off center with respect to the rod 98 and the tension thereof holds arm 96 back in the position just described.

We provide a novel cleaning mechanism to remove fruit and gummy residue adhering to the pressing surface of the blocks 45. At the discharge end of the pressing machine, a frame 120, disposed at a 45 degree angle with respect to the supporting posts 12, pivotally connected to the latter slightly above the level of the belt 46, and held in position by means of the spring 121, supports a set of wipers 122 which extend rearwardly and pass over the pressing surface of the blocks 45 as they are drawn upwardly for the return trip. (See Figure 1.) In order that this mechanism shall operate efficiently and not interfere with the travel of the pressing block, we have provided a pair of upright bars 123, secured to the frame 120, close to the lower end thereof, and held in the angle thus formed by means of the rods 124 with an adjusting screw 125 for purpose of adjustment for different sized pressing blocks. These bars 123 are adapted to ride over the pins 89 in the blocks 45, causing the whole cleansing mechanism to be pushed outwardly to give sufficient clearance for the block 45 without sacrificing the necessary pressure of the wiping here supplied by the spring 121.

Since the wiping step takes place directly above the box of pressed fruit as the block 45 is being lifted therefrom it will be obvious that fruit adhering to the block will be caused to drop into the box as the latter moves along.

To complete the cleaning of the block 45 and wet same to prevent the prunes in the next box from sticking to it, spaced apart wipers 126, supported by a pipe 127, mounted on upright pipe 128, extend transversely with respect to the chain 49 and are adapted to drag across the pressing surface of the block 45 as it passes thereunder. Pipe 127 is perforated, as at 127$^a$, and steam, supplied through the pipe 128, is sprayed therethrough onto the pressing block between the two wipers, softening gummy residue thereon which is easily wiped therefrom by the last wiper in preparation for the next pressing operation.

In Figure 1 the chain 49 is shown equipped with four pressing blocks. The machine thus stands ready for use in connection with small boxes of fruit. When larger boxes of fruit are to be run, two of the blocks, opposites on the chain 49 are replaced by larger pressing blocks not provided with the dogs 95 at the ends of the slides 58. The two remaining small blocks actuate the timing mechanism but serve no other purpose under these particular conditions, the larger blocks alone pressing the fruit. The larger blocks are identical in all respects with the smaller ones and function in the same manner. Disposal of the collars at the completion of the pressing operation is also obtained in the matter heretofore described.

To permit the device to operate on larger boxes and collars we provide means for increasing the distance between the belt 46 and the chain 49.

The chain 49 and mechanism associated therewith are supported by shafts 130, the ends of which are thrust through the slides 131 vertically disposed in the channel irons 132 mounted on the frame posts 12. The apertured spaced lugs 133 integral with each of the slides 131 are threaded to receive the screws 135 which are rotated by means of the bevel gears 136 connected to the lower ends thereof. Handwheels 137, mounted on the shafts 138, rotate the gears 136 through the medium of corresponding bevel gears (not shown.) Thus, rotation of the handwheels 137 will raise the chain 49 and the mechanism associated therewith to the desired level above the belt 46, the shaft 130 riding freely in the slots 139 in the channel irons 132 and frame posts 12.

To adjust the guides 9 and 85 to accommodate the larger boxes and collars, the following mechanism is employed: A post 140 having a key 141 welded or otherwise affixed thereon with a 90 degree turn therein, is held by the bracket 142 on the chain support 88 by means of the collar 143, and extends downwardly through a slotted hinged bracket 144 connected to the frame post 12. When the chain 49 and mechanism associated therewith is raised for the larger boxes, the key 141 rides in the slot of the bracket 144 and gives the post 140 a 90 degree turn to operate the guide bar adjusting means about to be described.

The guide bar 9 is provided with a pair of integral plates 145 which are slotted as at 146 at a substantially oblique angle. As the link 147, rigidly connected to the post 140, is swung around it draws the guide bar 9 backwardly through the medium of the rod 148 by causing the slots 146 in the plates 145 to ride on the pins 149.

Similar mechanism is employed to draw the guide bars 85 further apart to accommodate the larger boxes and collars. Here, however, horizontal supports 156, provided for the guide bars 85, slide in the guides 153 in the adjustment of the distance. The said supports have pins 155 adapted to ride in the oblique slots of plates 154, the latter being disposed transversely with respect to the supports, and riding in the guides 153. In drawing the bar 85 away from its opposite equivalent, a link 150, on the post 140, pushes the rod 151 and pulls rod 152, to slide the plates 154 past the pins and thus draw the supports inwardly.

It is to be noted that in the cases of both the guide bars 9 and 85, the guide bar on one side remains stationary.

The operation of the device just described is as follows: a box of fruit with the collar in place travels on the belt to the first pair of stops in the delivery mechanism. These stops prevent the box from bumping the preceding box in the line and driving it out of the position in which it will receive the pressing block. The momentum of the box hitting the stops moves the latter and the bars associated therewith forwardly and upwardly lifting the box clear of the belt, in which position it is held until such time as the second set of stops are clear of the preceding box. The mechanism hereinbefore described lowers the bars and the stops below the level of the belt and the box passes over the toothed pulley and the idler rollers to the inclined shoes, the latter braking the movement of the box.

As the pressing block nears the end of its return trip and begins to drop, pins carried by it engage the guides which are adapted to maintain the pressing surface of the block in a true horizontal position, ready for entry into the box.

At this point, the shoes are leveled to horizontal position, permitting the forward end of the box to drop on the conveyor belt under the pressing mechanism in perfect timing with the directional movement of the pressing block immediately above, which at this point begins entering the box.

The conveyor belt and the chain carrying the pressing block have the same directional relation and speed and the latter being inclined with respect to the former, the block is forced into the box as the two move forward toward the end of the pressing operation.

As previously set forth, the hooks on the block have engaged the hooks on the collar, consequently when the block is withdrawn from the box at the upturn of the chain, the collar is lifted from the box and carried along with the block on the return trip. The hooks on the block drop out of engagement with the hooks on the collar and the said collar is picked up by the guides for separation from the block. Successive collars drive the uppermost one up the inclined guide and on to the return chute.

The box containing the pressed fruit passes along a suitable conveyor to the point at which it is lidded and otherwise made ready for shipment.

Having thus described our invention, what we claim and desire to secure by grant of Letters Patent is:

1. A device for pressing fruit comprising an endless conveyor, a superposed endless pressing member, pressing blocks on said pressing member adapted to enter boxes carried by said conveyor, means for timing the entry of said blocks into said boxes, and members appurtenant to said pressing blocks for actuating said timing means.

2. A device for pressing fruit comprising an endless conveyor, a superposed endless pressing member, pressing blocks on said pressing member adapted to enter boxes carried by said conveyor, means for timing the delivery of said boxes to said conveyor and the entry of said blocks into said boxes, and members appurtenant to said pressing blocks for actuating said timing means.

3. A device for pressing fruit comprising an endless conveyor, a superposed endless pressing member, pressing blocks on said pressing member adapted to enter boxes carried by said conveyor and press the contents thereof to a predetermined level, a delivery mechanism adapted to deliver boxes to said conveyor, means for controlling the delivery of said boxes to said conveyor and the entry of said blocks into said boxes, and members appurtenant to said pressing blocks for actuating said box delivery control means.

4. A device for pressing fruit comprising an endless conveyor, a superposed endless pressing member inclined forwardly with respect to said conveyor, pressing blocks on said pressing member adapted to enter boxes carried by said conveyor and press the contents thereof to a predetermined level, a delivery mechanism for delivery of boxes to said conveyor, means for controlling the operation of said delivery mechanism, and members appurtenant to said pressing blocks for actuating the controlling means for said delivery mechanism.

5. A device for pressing fruit comprising, an endless conveyor, a superposed endless pressing member, pressing blocks on said pressing member adapted to enter boxes on said conveyor through collars on said boxes and press the contents thereof to a predetermined level, and engageable means carried by said blocks and collars for removal of the latter from said boxes at the completion of the pressing operation.

6. A device for pressing fruit comprising, an endless conveyor, a superposed endless pressing member, pressing blocks on said pressing member adapted to enter boxes passing thereunder through collars thereon, means associated with said block for removal of said collars from said boxes at the completion of the pressing operation, and means associated with said pressing member for separation of said collars and said blocks.

7. A device for pressing fruit comprising, an endless conveyor, a superposed endless pressing member, pressing blocks on said pressing member, a delivery mechanism for delivery of boxes between said conveyor and said pressing member, adjustable box guides on said delivery mechanism, and adjustable means for positioning the pressing member at varying distances from the conveyor which will simultaneously adjust the distance between said box guides.

8. A device for pressing fruit comprising, an endless conveyor, a superposed endless pressing member, pressing blocks on said pressing member adapted to enter boxes passing thereunder through collars thereon, means attached to said blocks and said collars for removal of said collars from said boxes at the completion of the pressing operation, adjustable means associated with said pressing member for separation of said collars and said blocks, adjustable box guides on said delivery mechanism, and adjustable means for positioning the pressing member at varying distances from the conveyor which will simultaneously effect the adjustment of said block and collar separation means and said box guides.

9. In a device for pressing fruit, a pressing block adapted to enter boxes through a collar thereon and press the contents to a predetermined level, and engageable means attached to said block and said collar for removal of the latter from said box at the completion of the pressing operation.

10. In a device for pressing fruit, a pressing block adapted to enter boxes through a collar thereon and press the contents to a predetermined level, connecting means for said block and said collar for removal of the latter from said box at the completion of the pressing operation, and means associated with said connecting means causing the latter to disengage when said block and collar are inverted.

11. In a device for pressing fruit, a delivery mechanism comprising, a conveyor belt adapted to transport boxes of fruit, stops disposed on both sides of said belt, bars operatively connected to said stops and in line therewith normally disposed below the level of said belt, said stops being adapted to move forwardly under impact of a box and pull the bars forwardly and upwardly to raise the box above the belt level, and means for depressing said stops below the level of the belt and returning said bars to their normal position.

12. In a device for pressing fruit, a delivery mechanism comprising, a conveyor belt, stops disposed on both sides of said belt, box lifting members operatively connected to said stops and adapted to raise a box above the level of the belt, said stops being adapted to move forwardly under impact of a box and actuate said box lifting members, and means for depressing said stops below the level of the belt and returning said box lifting members to their normal position to permit a box to pass thereover.

13. In a device for pressing fruit, a delivery mechanism comprising a conveyor belt, a pulley at the end of said belt having teeth projecting above the belt level adapted to engage a box, idler rollers beyond said pulley, depressible box thrusting members disposed on either side of said rollers, and tiltable braking members beyond said thrusting members adapted to raise the forward end of a box above the plane of said belt, said braking members being operatively connected to said thrust members and adapted to be tilted back to a horizontal plane when said thrust members engage the rear end of a box and move it forwardly.

14. In a device for pressing fruit, a box delivery mechanism comprising depressible box thrusting members and tiltable braking members adapted to raise the forward end of a box above a horizontal plane, said braking members being operatively connected to said thrust members and adapted to be tilted back to a horizontal plane by said thrust members when the latter engage the rear end of a box end and move the latter forwardly.

15. In a device for pressing fruit, a delivery mechanism comprising a conveyor belt, stops disposed on both sides of said belt, box lifting members operatively connected to said stops and adapted to raise a box above the level of the belt, said stops being adapted to move forwardly under impact of a box and actuate said box lifting members, means for depressing said stops below the level of the belt and returning said box lifting members to their normal position to permit a box to pass thereover, depressible box thrusting members disposed beyond and in the plane of said belt, and tiltable braking members adapted to raise the forward end of a box above a horizontal plane, said braking members being operatively connected to said thrust members and adapted to be tilted back to a horizontal plane by said thrust members when the latter engage the rear end of a box and move the latter forwardly.

16. In a device for pressing fruit, a conveyor belt, a superposed endless pressing member having spaced projections therefrom, pressing blocks carried by said pressing members, a box delivery mechanism adapted to deliver a box in timed relation to the movement of said pressing blocks, and a timing mechanism therefor comprising slidable members adapted to engage said projections on said pressing member and actuate said delivery mechanism.

17. In a device for pressing fruit, an endless pressing member, pressing blocks carried by said pressing member, a box delivery mechanism adapted to deliver a box in timed relation to the movement of said pressing blocks, means for controlling the release of said boxes from said delivery mechanism, and members appurtenant to said pressing blocks for actuating said box release controlling means.

18. In a device for pressing fruit, an endless pressing member, pressing blocks carried by said pressing member, and means for cleaning the pressing surface of said blocks at the completion of the pressing operation, comprising: tiltable wipers adapted to bear against the surface of said pressing blocks causing fruit adhering thereto to fall into the filled box passing thereunder and a tensioning member adapted to move said wipers back to their normal position when the pressing block has passed.

19. In a device for pressing material into containers, a conveyor belt, a superposed endless pressing member having spaced projections therefrom, a box delivery mechanism adapted to deliver a box in timed relation to the movement of said pressing member, and timing mechanism therefor comprising slidable members adapted to engage said projections on said pressing member and actuate said delivery mechanism.

FRANK A. RANDALL.
JOHN D. CANTONI.